US008326709B1

(12) United States Patent
Spreng et al.

(10) Patent No.: US 8,326,709 B1
(45) Date of Patent: Dec. 4, 2012

(54) AUTOMATED AUDIT PROCESS

(75) Inventors: Jim L. Spreng, Canton, OH (US); Scott Peterson, Canton, OH (US); Daniel P. O'Connor, Chagrin Falls, OH (US); David W. Peppard, Canton, OH (US)

(73) Assignee: Accenture Global Services Limited, Dublin (IE)

( * ) Notice: Subject to any disclaimer, the term of this patent is extended or adjusted under 35 U.S.C. 154(b) by 74 days.

(21) Appl. No.: 12/327,992

(22) Filed: Dec. 4, 2008

Related U.S. Application Data (63) Continuation of application No. 10/335,362, filed on Dec. 31, 2002, now Pat. No. 7,478,061.

(51) Int. Cl.
*G07B 17/00* (2006.01)

(52) U.S. Cl. ............ 705/30; 705/28; 705/29; 705/31; 705/40; 705/26; 705/37; 705/35; 705/24; 705/34; 705/38; 705/44; 705/20; 705/7; 705/11

(58) Field of Classification Search ............ 705/30
See application file for complete search history.

(56) References Cited

U.S. PATENT DOCUMENTS

| | | | | |
|---|---|---|---|---|
| 5,873,069 | A * | 2/1999 | Reuhl et al. ............ | 705/20 |
| 5,974,146 | A | 10/1999 | Randle et al. | |
| 6,366,889 | B1 | 4/2002 | Zaloom | |
| 6,882,986 | B1 | 4/2005 | Heinemann et al. | |
| 2002/0065736 | A1 * | 5/2002 | Willner et al. ............ | 705/26 |
| 2002/0143677 | A1 | 10/2002 | Prakash | |
| 2004/0186798 | A1 | 9/2004 | Blitch et al. | |
| 2004/0210526 | A1 | 10/2004 | Brown | |
| 2005/0165681 | A1 | 7/2005 | Heinemann et al. | |

OTHER PUBLICATIONS

Weise, Steven O. U.C.C. Article 9: Personal property secured transactions. Business Lawyer, v55n4, p. 2039-2057, Aug. 2000.*
Green Richard and Wong, Angela. Best practices in retailing: The ABC's of DSD for the everyday retailer. Nov. 1995. Chain Story Age, vol. 7, No. 11, pp. 54-60.

* cited by examiner

*Primary Examiner* — F. Zeender
*Assistant Examiner* — Fawaad Haider
(74) *Attorney, Agent, or Firm* — Fish & Richardson P.C.

(57) ABSTRACT

A process for increasing profits of a business engaged in the purchase of large numbers of products and/or products of volatile pricing from numerous vendors that operates to identify pricing errors, preferably typically before payment, by automatically reviewing all invoices typically in the order they are received to determine a best system price for each line item of each invoice by reference to pricing factors such as volume discount, seasonal pricing, price protection, commodity pricing, competition pricing, and cash discount recorded in memory for the subject item and reference to payment history data, accounts payable data and invoice data. From the pricing factors and associated data, a best system price is determined and compared to the invoice price for the item so that pricing errors are automatically uncovered and, if appropriate, flagged to identify the same as an exception for warning or notification.

22 Claims, 4 Drawing Sheets

AUTOMATED AUDIT PROCESS

CROSS REFERENCE TO RELATED APPLICATION

This application is a continuation of U.S. application Ser. No. 10/335,362, filed Dec. 31, 2002, which is incorporated herein by reference.

BACKGROUND OF THE INVENTION

The invention relates to automation of audit functions for reducing lost profits attributable to overpayments for purchased products.

PRIOR ART

Commercial activities of medium and large business entities such as major retail chains, distributors, healthcare organizations and manufacturers can involve the purchase of huge numbers of. items and/or items with volatile pricing. Price protection, volume discounts, cash discounts, seasonal pricing and other sources of volatility frequently have effective dates that are independent of purchase order or invoice dates. The shear volume of products and transactions makes it difficult to monitor the transactions to be certain that the appropriate price benefits are realized by the purchaser. Still further, human error in determining pricing for items remains a problem at both the vendor and purchaser ends of a transaction. Surveys indicate that an average of 3.6% of vendor invoices contain errors. For reference purposes, a medium size company may have an average of 1,000-5,000 employees and large companies may have more than 5,000 employees. It is reported that 60% of all companies with 250-499 employees have between 1,000 and 5,000 vendors; about 90% of all companies have less than 20,000 vendors.

SUMMARY

The invention provides a profit enhancing method for use by medium to large supply chain businesses or enterprises engaged in the purchase of goods of variable price. The method increases profits by reducing erroneous overpayments to vendors for goods purchased over time in the regular course of business. The invention is capable of preventing erroneous payments and consequent losses before they occur. The software method of the invention involves the entry of settings of prices and their effective dates and other qualifiers and the input of sufficient data, by either electronic methods, if possible, or manually, to enable the automatic determination of the appropriate price based on dates, volume and other known factors, of a purchased item and to compare that appropriate price with an invoice price. Still further, the method contemplates the generation of automatic reports of overcharges for issuance to a vendor. Such reports or exceptions can be made after suitable filtering to exclude insignificant pricing errors and any other desired adjustments. In the context of the present invention, an exception before payment of an invoice is a "warning" and after payment of an invoice is a "notification".

The invention is particularly suited for medium to large size businesses that process large volumes of invoices. By way of example, surveys indicate these companies pay an average of about 10,000 to 11,000 invoices per month (for a medium size company) to about 100,000 to 360,000 or more invoices per month (for a large company). Companies at the high end of these numbers make significant use of EDI (Electronic Data Interchange) invoices.

More specifically, the software program method discovers invoice pricing mistakes at the product level. The process searches the system's stored pricing information to find the best price that could apply on a given date associated with an invoice. This best price can, for example, result from vendor price protection offers, volume discounts, cash discounts, and the like. The process will inherently uncover even unintentional pricing errors originating at the vendor.

The method of the present invention can, among other benefits, improve vendor relations and performance by minimizing post-audit claims, which through the passage of time can become problematic since it can uncover exceptions on a pre-audit basis, increase cash flow by avoiding processing errors, and improve working capital and cash forecasts.

The program method relies on the unique use of payment history data, accounts payable data and invoice data with the optional use of receipt data and purchase order data.

DESCRIPTION OF THE PREFERRED EMBODIMENT

Figure 1:
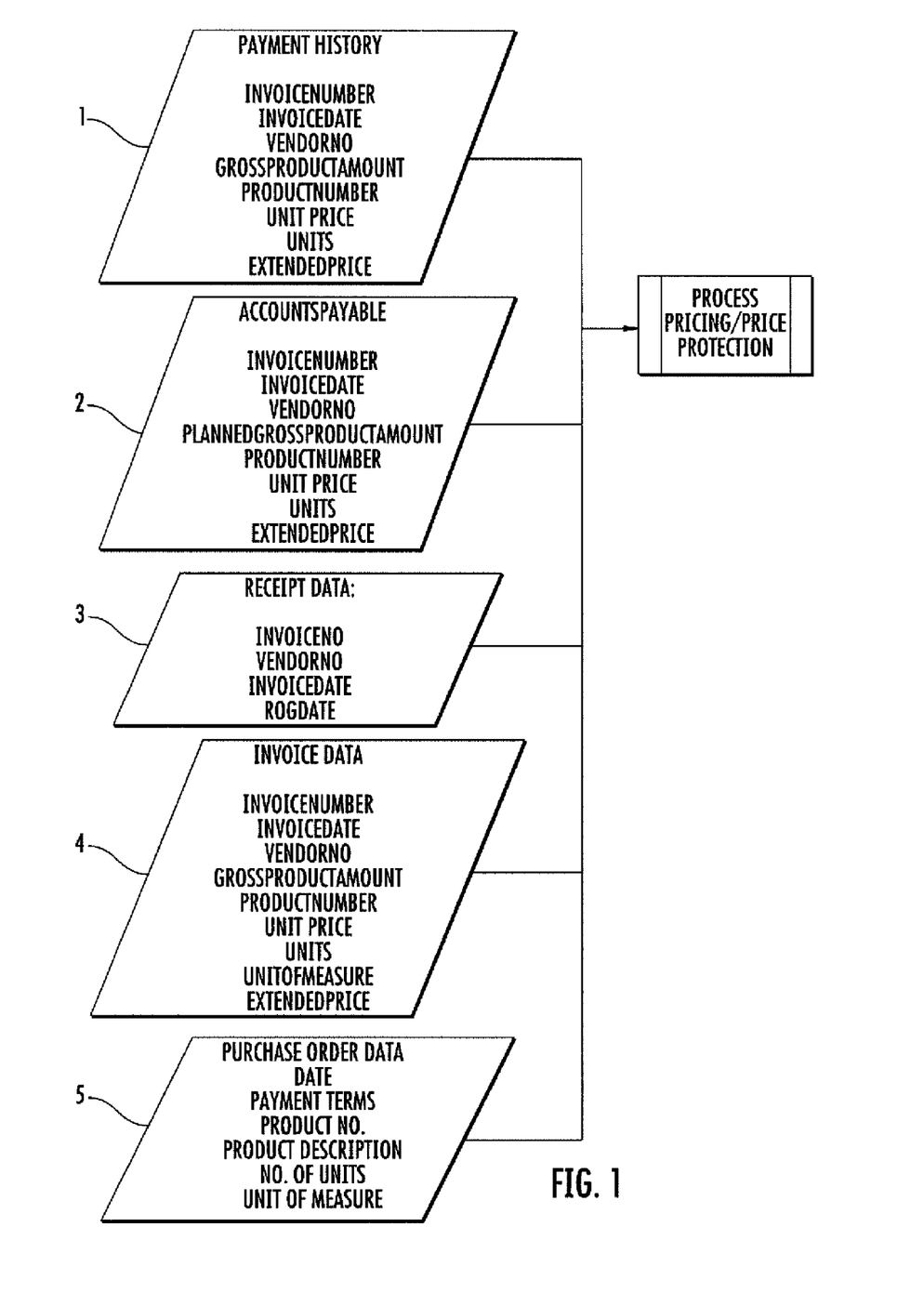
FIG. 1 is a diagrammatic representation of the data preferably available for use with the process of the invention.

Referring to FIG. 1, the rhomboids or boxes 1-5 represent categories of data used in the process of the invention. The categories of payment history 1, accounts payable 2, and invoice data 4, are of primary importance, while the receipt data 3 and purchase order data 5 are optional. In each of the boxes 1-5, representative data information is listed.

Figure 2A:
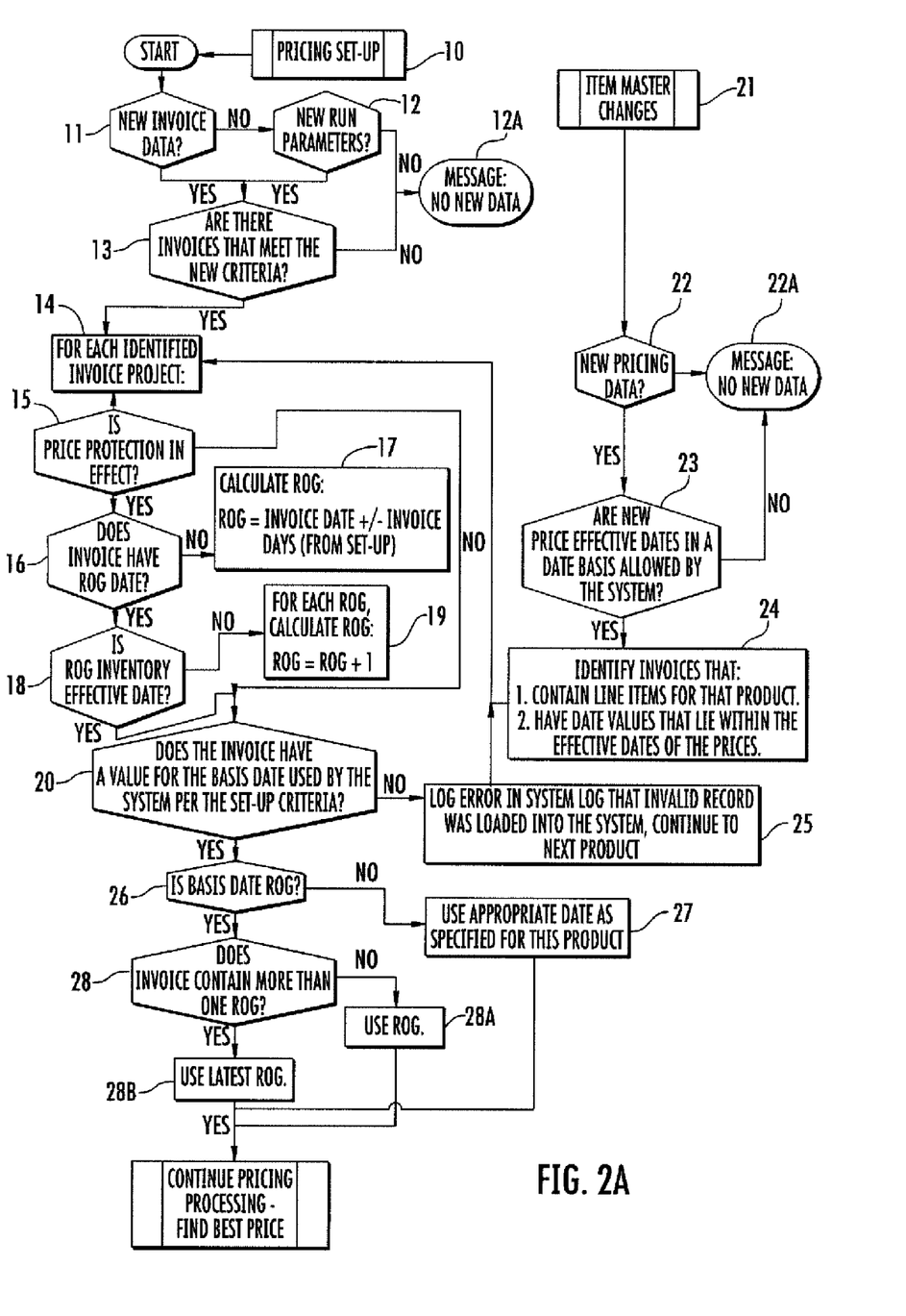
FIG. 2A is a flow chart representing a portion of the process of the invention that determines a base date and a receipt of goods date (ROG)

Referring now to FIG. 2A, the block 10 represents a step of loading product pricing information into memory storage either electronically or manually by keyboarding. Typically, this information will be the price of a particular product from a corresponding vendor. The price may be dependent on sales volume, date, price protection program or other variable and may be subject to a cash discount. It will be further understood that from time to time, ordinarily depending on notification from a vendor, the price of a product or item will change and, similarly, discounting terms may change and these changes will be recorded in the system by performing the step 10 at any appropriate time. The pricing set up step 10 then represents the establishment of a table for the price(s) of each item a user of the program expects to purchase. More than one price for the same item or product from one vendor can be entered in the table at the same time or at different times as a result of pricing programs or discounts offered from time to time by a vendor. Ordinarily each price will have an effective date or term assigned to it when entered in the system. At step 11, the program queries whether new invoice data has been input into the system since the last run. If not, the system queries at step 12, whether new run parameters or "settings" have been loaded into the system. If neither new invoice data nor new run parameters are present, as indicated by the balloon 12A, a message indicates that no new data is present and the program does not proceed. If there is an affirmative of the receipt of new data at box 11 or new parameters at 12, at step 13 the program queries if invoices exist that meet the new criteria or parameters. If not, the program again leads to the message balloon 12A indicating no new data, and the process terminates. If invoices meet the new criteria, the process proceeds to step 14.

The block at step 14 reflects that each item or product identified on an invoice is examined in a series of subsequent events. At block 15, it is determined if price protection is in effect. If not, the process skips to step 20, discussed below. If yes, a query at step 16 is made to determine if the subject invoice has a receipt of goods (ROG) date. A price protection situation typically occurs in technical fields where technology changes rapidly and a manufacturer (vendor) may give a retroactive price reduction to the purchaser that has affected goods in inventory or goods in transit from the vendor to the purchaser. A receipt of goods date is important, for example, to show that the goods came in after the effective date of the price protection. If there is no receipt of goods date, the process can calculate an ROG date from a formula given in the block 17 or a like formula that is entered in the original settings of the program. At step 18 the query is if ROG is the effective inventory date. If not, ROG is calculated by adding one day to the original ROG and this process continues until ROG is set to be the inventory effective date at the operation represented by the box 19.

Block 21 represents an event when changes are made to an item master that lists items or products that the system user can purchase. In step 22, the system determines if new pricing data exists. If no new pricing data was entered, the process would indicate the message in step 22A. If the inquiry at step 22 is a "yes", the process proceeds to step 23, which asks a query that, in effect, determines whether there are any invoices loaded in the system that are affected by the new pricing data. If the determination in 23 is positive, the process proceeds to step 24 where invoices are identified that contain line items for that product(s). and have date values that lie within the effective dates of the prices. Invoices identified by the step 24 are treated by processing them through step 14 and subsequent steps through 18 to identify an ROG.

To recap, starting with step 10, the program is looking for parameters that may have changed or new invoice data that has been loaded. On the other hand, starting at step 21 and proceeding through step 24, the system is dealing with changes in pricing information. Stated in other words, steps 21 through 24 involve pricing changes to products on the item master. On the left, the process involves the effect of loading new data into the system. At step 20, the invoice record is checked to see if it has a date for the basis date previously entered in the system settings. If not, the system follows step 25 where an error in this invalid record is logged in and the process continues to the next product on the invoice. If the invoice has a basis date, the process proceeds to step 26 where the inquiry is if the basis date is ROG. If not, the process goes to step 27, where an appropriate date from the system settings is assigned to the product being processed. It may be, for example, that the basis date is the purchase order date such as where the purchaser is buying a commodity. Generally, the basis date is the date which the system will use to determine the appropriate price.

If the basis date is the ROG, the system proceeds to step 28 where it is determined if more than one ROG is contained on an invoice. If not, the process goes through step 28A and then to step 29 where the ROG is used. If more than one ROG is contained on the invoice, the process, as indicated in block 28B assigns the latest ROG and proceeds to step 29.

Figure 2B:
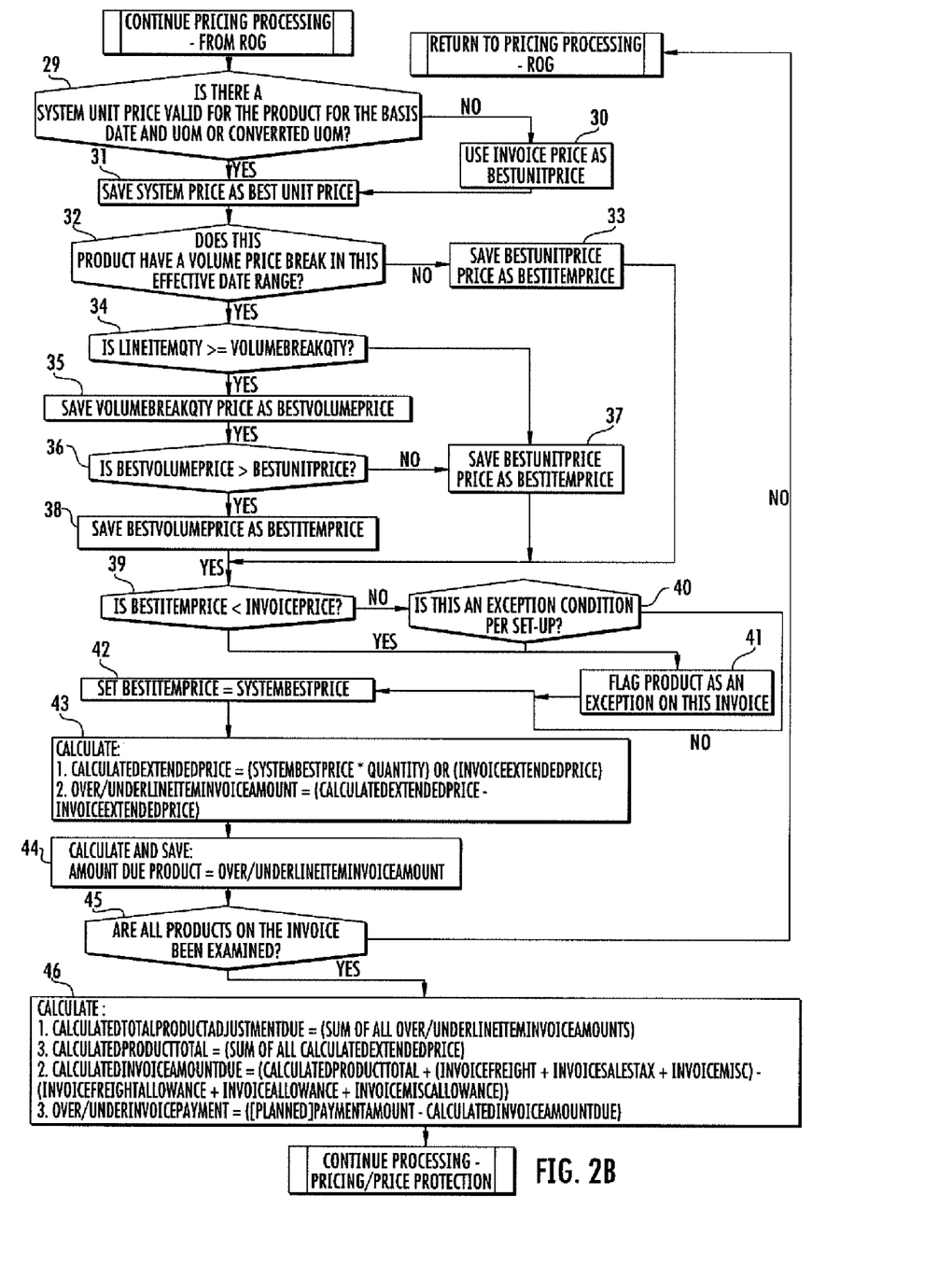
FIGS. 2B and 2C are flow charts continued from the chart of FIG. 2A representing the processing of pricing and price protection to detect errors on vendor invoices at the product level.

Referring now to FIG. 2B, at the step 29, the system checks for a system unit price valid for the product for the basis date and a unit of measure or converted unit of measure. For example, if the price is for a dozen items, the unit measure is for each item or $1/12$ of the price per dozen. If there is no system price, the system follows the step at block 30 where the invoice price is used as the BestUnitPrice. If there is a valid system unit price and a unit of measure (UOM), the process proceeds to step 31 where the system price is saved as BestUnitPrice. At step 32, the system queries if the product has a volume price break in the effective date range. If no, the system performs step 33 where the BestUnitPrice is saved as the BestItemPrice. Alternatively, if there was a volume price break, the system determines if the LineItemQty (quantity) is greater or equal to VolumeBreakQty. If the quantity is less than the volume break, the system proceeds to step 37 where the BestUnitPrice is saved as the BestItemPrice. If the quantity is equal to or greater than the price break, the system proceeds to step 35 where the VolumeBreakQty price is saved as the BestVolumePrice. At the next step, 36, it is determined if the BestVolumePrice is greater than the BestUnitPrice. If not, the system proceeds to step 37 where the BestUnitPrice is saved as the BestItemPrice. If the BestVolumePrice is greater than BestUnitPrice, the system saves the BestVolumePrice as the BestItemPrice at step 38. At step 39, the BestItemPrice is compared with the invoice price. If the BestItemPrice is not less than the invoice price, the system performs step 40 to determine if the item is an exception according to the program set up and, if not, proceeds to step 42. If this item is an exception according to the set up, the process proceeds to step 41 where the item or product is flagged in the system record as an exception on the invoice being processed. On the other hand, if the BestItemPrice is less than the 'InvoicePrice, the process at step 41 flags the product as an exception on the invoice in the system record. Whether or not the BestItemPrice is less than the InvoicePrice, the system proceeds to step 42 where the SystemBestPrice is defined as the BestItemPrice.

The process proceeds to step 43 where CalculatedExtendedPrice and Over/UnderLineIteminvoiceAmount are calculated. At step 44, the AmountDueProduct is defined as Over/UnderLineInvoiceAmount. At the subsequent step 45, the system determines if all products on the invoice being processed have been examined. If not, the system returns to step 14. When all of the products on an invoice have been examined, the system proceeds to step 46 where certain calculations are made based on a summation of all Over/UnderLineIteminvoiceAmounts. At the step indicated at 46, the whole invoice is viewed to calculate an Over/UnderInvoicePayment.

Step 40 is optional on the part of the user of the system and, typically, would not be used if he chooses to ignore instances where the invoice price is lower than the system's BestItemPrice. It will be understood that the program is arranged to take the lower of the two product costs reflected by purchase order cost or invoice cost.

Figure 2C:
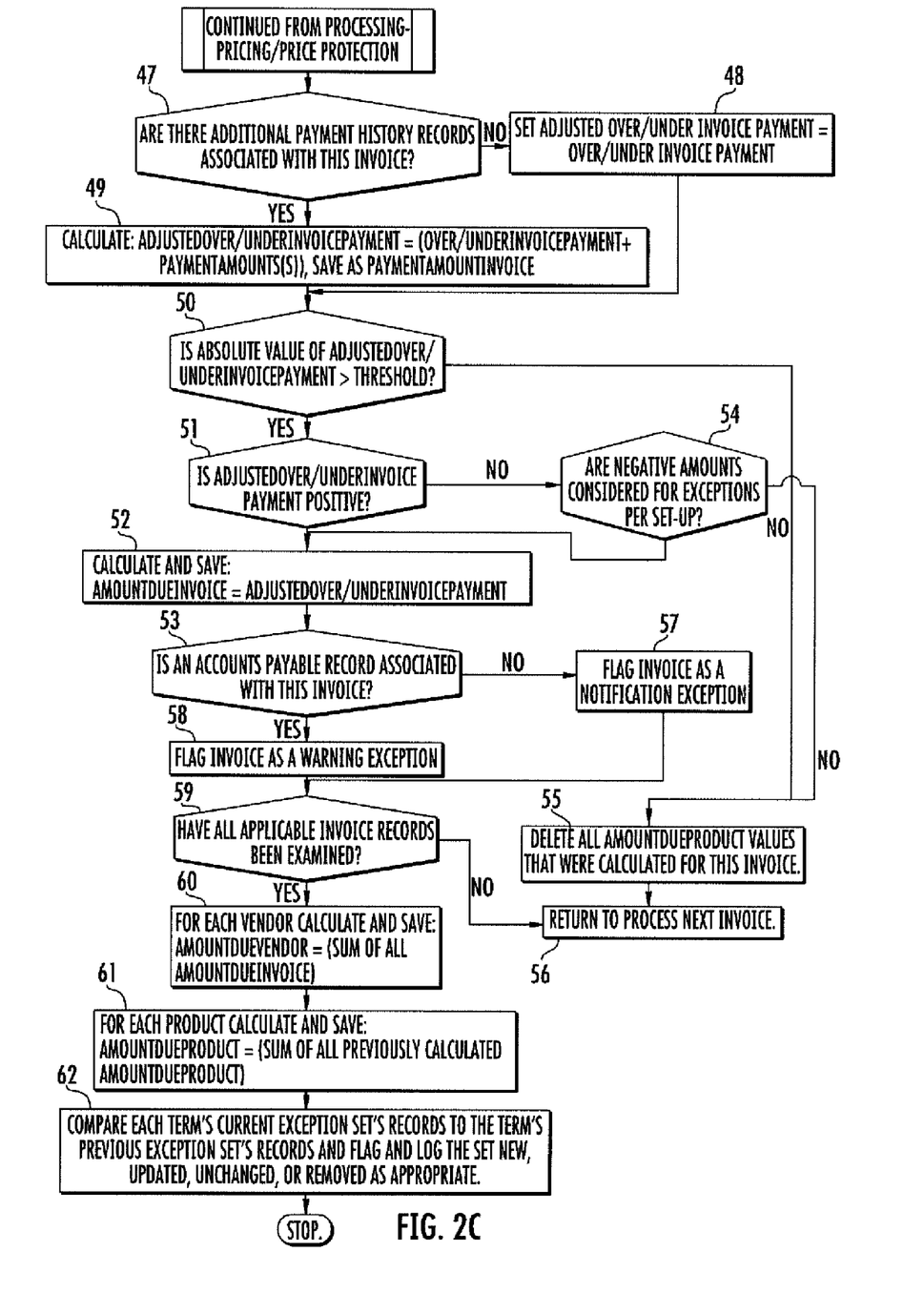

With reference to FIG. 2C, step 47 is performed to determine from payment history records if any payments have been made for the invoice being examined. This step 47, it will be noted, is in the nature of a post-audit or post-payment inquiry. If there are no additional payment history records or accounts payable records associated with the subject invoice, the process performs the step 48 where Over/UnderInvoicePayment is adopted as the AdjustedOver/UnderInvoicePayment. If there were additional payment history records or accounts payable records for the invoice, the process goes to step 49 to calculate an AdjustedOver/UnderInvoicePayment.

At a subsequent step 50, the system determines if the absolute value of the AdjustedOver/UnderInvoicePayment is greater than a threshold setting. If the response is "no" the process goes to step 55 where all AmountDueProduct values are deleted for this invoice. If the absolute value is above the threshold, step 51 is performed to determine if it is a positive number. If it is not a positive number, the system checks at step 54 if negative amounts are to be considered as exceptions that, for example, are to be reported to the vendor. If such negative amounts are not to be reported as exceptions, the process goes to step 55 where, again, the AmountDueProductValues are deleted. If at step 54 negative amounts are to be-considered for exceptions, the process goes to step 52. If as determined in step 51 the result is positive, the process also advances to step 52. At this step, an AmountDueInvoice is defined as the AdjustedOver/UnderInvoicePayment. Next, the system determines if an accounts payable record is associated with the invoice in question at step 53. If not, the system concludes the invoice was paid and the invoice is flagged in the system record as a notification exception at step 57 and the system advances to step 59. If it is determined at step 53 that there is an accounts payable record, then at step 58 the invoice is flagged in the system record as a warning exception.

It will be understood that for a particular user purchasing goods, invoices, purchase orders, accounts payable reports, product receipt data and payment history reports will be uploaded into the memory of the system on a typically random continuous basis. The invoices are entered, typically, as they are presented to the user and are not ordinarily separated or organized either when being uploaded or when being processed in any particular order either alphabetically by vendor or number or date.

From step 58 or 57, the process advances to step 59 and queries whether all applicable invoice records have been examined. If not, the system returns, as indicated in step 56 to step 13. If all applicable invoice records have been examined, the process reaches step 60 where, for each vendor, AmountDueInvoices calculations are made. Subsequently, step 61 is performed such that for each product an AmountDueProduct is calculated. Finally, at step 62, the current exception sets records are compared to the previous exception set records and the current records are flagged in the system as New, Updated, Unchanged or Removed as appropriate. When the step 62 has been completed, the program is completed. The exceptions can be reviewed by the user to determine which of them should be forwarded electronically to the vendor. If desired, the exceptions can be forwarded to the vendor without human intervention.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A computer-implemented method comprising:
   accessing an invoice received from a vendor of an enterprise;
   identifying an item and a quantity for the item listed on the invoice;
   determining a base date and an invoice price associated with the item;
   selecting, from among multiple prices stored for the item and the vendor in a storage medium, a lowest price that is valid for the identified quantity of the item on the associated base date;
   designating the lowest price as a best system price that applies on the base date;
   comparing the best system price with the invoice price; and
   flagging, by one or more computers, the invoice as an exception when the invoice price of the item exceeds the best system price by a predefined threshold.

2. The method of claim 1, further comprising:
   storing a list of items expected to be purchased by the enterprise, prices associated with each item expected to be purchased, and terms associated with each price, each term including an effective date term,
   wherein the lowest price is determined based on comparing the base date associated with the identified item with the stored list.

3. The method of claim 2, wherein the terms further comprise sales volume terms, price protection terms, seasonal pricing terms, commodity pricing terms, competition pricing terms, and cash discount terms, collectively.

4. The method of claim 1, wherein determining the lowest price further comprises determining whether price protection was in effect on the associated base date.

5. The method of claim 4, wherein determining whether price protection was in effect on the associated base date further comprises calculating a receipt of goods (ROG) date for the respective item.

6. The method of claim 1, wherein flagging the invoice as an exception further comprises:
   generating a warning when the invoice price of any identified item exceeds the best system price by a predefined threshold, and when payment for the item has not been made to the vendor;
   generating a notification when the invoice price of any identified item exceeds the best system price by a predefined threshold, and when payment for the item has been made to the vendor; and
   generating a report of warnings and notifications.

7. The method of claim 1, wherein the base date for each item comprises a purchase order date or an invoice date.

8. The method of claim 1, wherein determining the invoice price associated with the item further comprises:
   determining an invoice price associated with a group of items;
   determining a quantity of items in the group; and
   dividing the invoice price associated with the group of items by the quantity of items in the group.

9. A system comprising:
   one or more computers; and
   a computer-readable medium coupled to the one or more computers having instructions stored thereon which, when executed by the one or more computers, cause the one or more computers to perform operations comprising:
      accessing an invoice received from a vendor of an enterprise,
      identifying an item and a quantity for the item listed on the invoice,
      determining a base date and an invoice price associated with the item,
      selecting, from among multiple prices stored for the item and the vendor in a storage medium, a lowest price that is valid for the identified quantity of the item on the associated base date, designating the lowest price as a best system price that applies on the base date, comparing the best system price with the invoice price, and flagging the invoice as an exception when the invoice price of the item exceeds the best system price by a predefined threshold.

10. The system of claim 9, wherein the operations further comprise:

storing a list of items expected to be purchased by the enterprise, prices associated with each item expected to be purchased, and terms associated with each price, each term including an effective date term, wherein the lowest price is determined based on comparing the base date associated with the identified item with the stored list, and wherein the terms further comprise sales volume terms, price protection terms, seasonal pricing terms, commodity pricing terms, competition pricing terms, and cash discount terms, collectively.

11. The system of claim 9, wherein determining the lowest price further comprises determining whether price protection was in effect on the associated base date.

12. The system of claim 11, wherein determining whether price protection was in effect on the associated base date further comprises calculating a receipt of goods (ROG) date for the respective item.

13. The system of claim 9, wherein flagging the invoice as an exception further comprises:

generating a warning when the invoice price of any identified item exceeds the best system price by a predefined threshold, and when payment for the item has not been made to the vendor;

generating a notification when the invoice price of any identified item exceeds the best system price by a predefined threshold, and when payment for the item has been made to the vendor; and generating a report of warnings and notifications.

14. The method of claim 9, wherein the base date for each item comprises a purchase order date or an invoice date.

15. The system of claim 9, wherein determining the invoice price associated with the item further comprises:

determining an invoice price associated with a group of items;

determining a quantity of items in the group; and dividing the invoice price associated with the group of items by the quantity of items in the group.

16. A non-transitory computer-readable medium encoded with a computer program comprising instructions that, when executed, operate to cause a computer to perform operations comprising:

accessing an invoice received from a vendor of an enterprise;

identifying an item and a quantity for the item listed on the invoice;

determining a base date and an invoice price associated with the item;

selecting, from among multiple prices stored for the item and the vendor in a storage medium, a lowest price that is valid for the identified quantity of the item on the associated base date;

designating the lowest price as a best system price that applies on the base date;

comparing the best system price with the invoice price; and flagging the invoice as an exception when the invoice price of the item exceeds the best system price by a predefined threshold.

17. The computer-readable medium of claim 16, wherein the operations further comprise:

storing a list of items expected to be purchased by the enterprise, prices associated with each item expected to be purchased, and terms associated with each price, each term including an effective date term, wherein the lowest price is determined based on comparing the base date associated with the identified item with the stored list, and wherein the terms further comprise sales volume terms, price protection terms, seasonal pricing terms, commodity pricing terms, competition pricing terms, and cash discount terms, collectively.

18. The computer-readable medium of claim 16, wherein determining the lowest price further comprises determining whether price protection was in effect on the associated base date.

19. The computer-readable medium of claim 18, wherein determining whether price protection was in effect on the associated base date further comprises calculating a receipt of goods (ROG) date for the respective item.

20. The computer-readable medium of claim 16, wherein flagging the invoice as an exception further comprises:

generating a warning when the invoice price of any identified item exceeds the best system price by a predefined threshold, and when payment for the item has not been made to the vendor;

generating a notification when the invoice price of any identified item exceeds the best system price by a predefined threshold, and when payment for the item has been made to the vendor; and generating a report of warnings and notifications.

21. The computer-readable medium of claim 16, wherein determining the invoice price associated with the item further comprises:

determining an invoice price associated with a group of items;

determining a quantity of items in the group; and dividing the invoice price associated with the group of items by the quantity of items in the group.

22. The method of claim 1, wherein selecting a lowest price that is valid for the identified quantity of the item on the associated base date comprises:

determining that the quantity satisfies a volume break quantity associated with a volume discount offered by the vendor for the item on the base date.

* * * * *

UNITED STATES PATENT AND TRADEMARK OFFICE
CERTIFICATE OF CORRECTION

| | |
|---|---|
| PATENT NO. | : 8,326,709 B1 |
| APPLICATION NO. | : 12/327992 |
| DATED | : December 4, 2012 |
| INVENTOR(S) | : Jim L. Spreng et al. |

It is certified that error appears in the above-identified patent and that said Letters Patent is hereby corrected as shown below:

In claim 14, column 7, line 39, delete "method" and insert -- system --, therefor.

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,326,709 B1
APPLICATION NO. : 12/327992
DATED : December 4, 2012
INVENTOR(S) : Jim L. Spreng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 362 days.

Signed and Sealed this
Seventh Day of January, 2014

Margaret A. Focarino
*Commissioner for Patents of the United States Patent and Trademark Office*